United States Patent [19]

Bajka

[11] Patent Number: 4,647,007
[45] Date of Patent: Mar. 3, 1987

[54] VALVE ACTUATOR WITH MANUAL DISENGAGEMENT ASSEMBLY

[76] Inventor: Peter Bajka, 725 Casita Way, Los Altos, Calif. 94022

[21] Appl. No.: 832,070

[22] Filed: Feb. 24, 1986

[51] Int. Cl.$^4$ ............................................. F16K 31/05
[52] U.S. Cl. ............................ 251/129.03; 251/129.12
[58] Field of Search ........................ 251/129.03, 129.12

[56] References Cited

U.S. PATENT DOCUMENTS

| | | |
|---|---|---|
| 2,550,906 | 5/1951 | Britton . |
| 3,938,553 | 2/1976 | Ortega . |
| 4,169,491 | 10/1979 | Bajka . |
| 4,398,562 | 8/1983 | Saarem et al. ............. 251/129.03 X |
| 4,470,429 | 9/1984 | Johnson . |
| 4,538,789 | 9/1985 | An .................................. 251/129.12 |
| 4,541,609 | 9/1985 | Smith ............................. 251/129.03 |

Primary Examiner—Arnold Rosenthal
Attorney, Agent, or Firm—Manfred M. Warren; Robert B. Chickering; Glen R. Grunewald

[57] ABSTRACT

An automatic valve operator provides manual override for selective manual and powered displacement of a valve. The valve operator includes a drive motor, a transmission assembly, and an axially shiftable coupling shaft for selective engagement or disengagement from the transmission assembly. Shifting the coupling shaft displaces electrical switches which substantially simultaneous de-energizing of the valve operator drive motor. The coupling shaft is maintained operatively in connection to the valve, during the axial shifting thereby permitting manual displacement of the valve independent of the transmission and motor. Adjustable limit switch actuating collars and a reversible electrical connector assembly also are disclosed.

22 Claims, 11 Drawing Figures

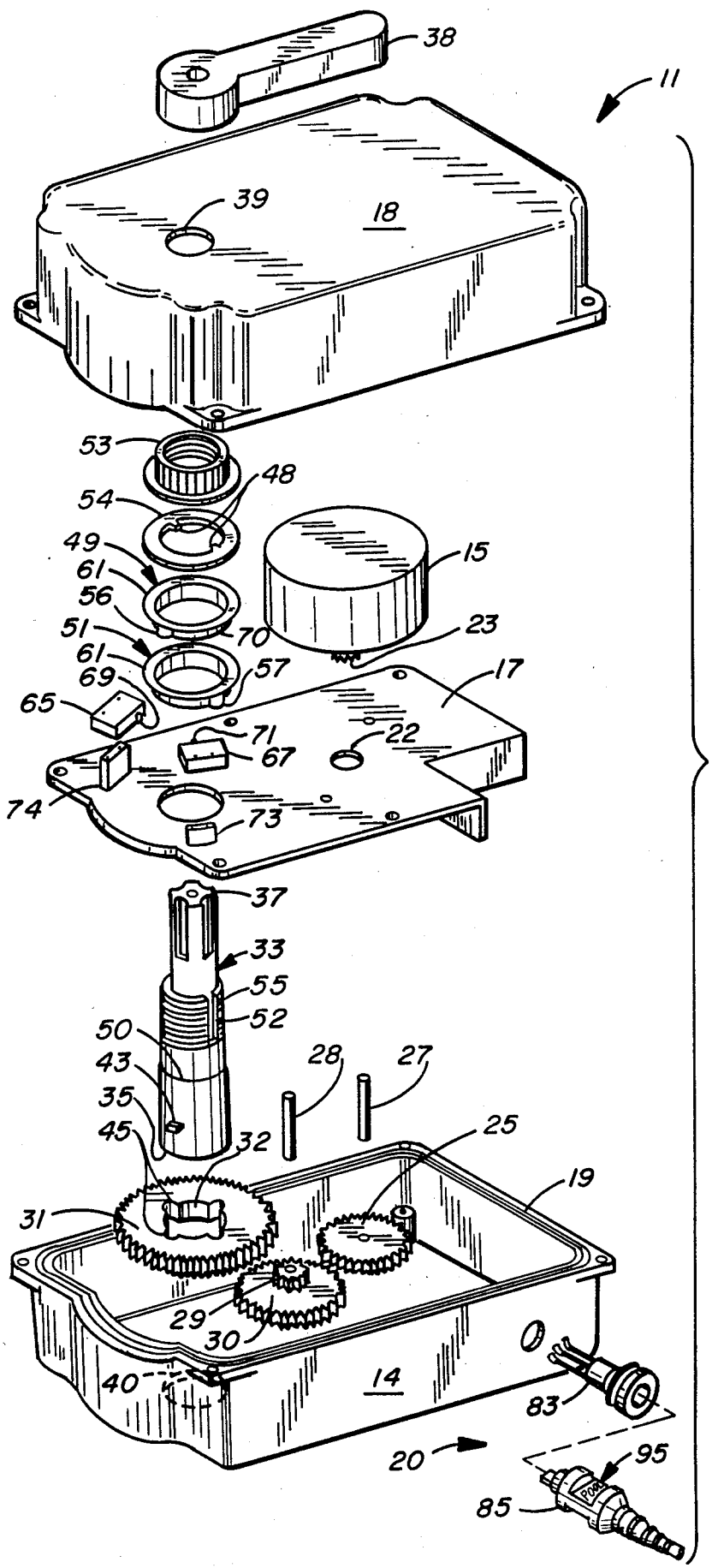
FIG._1

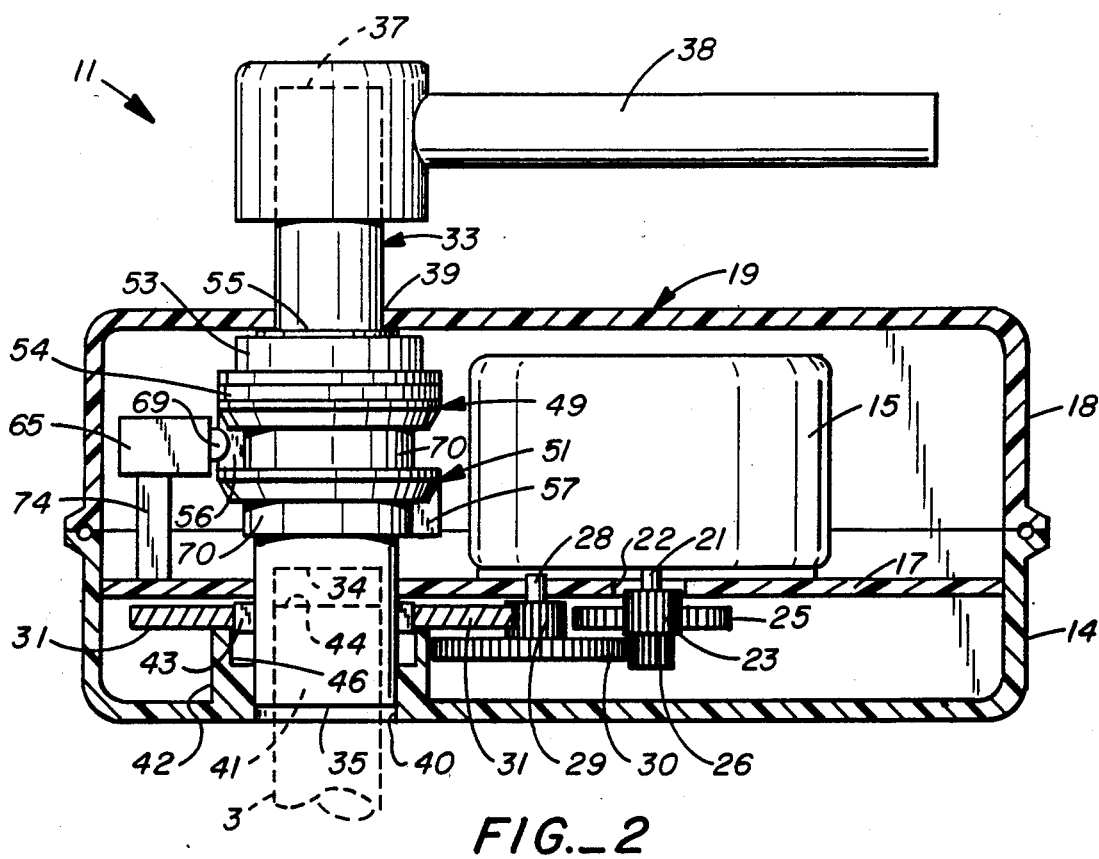
FIG._2
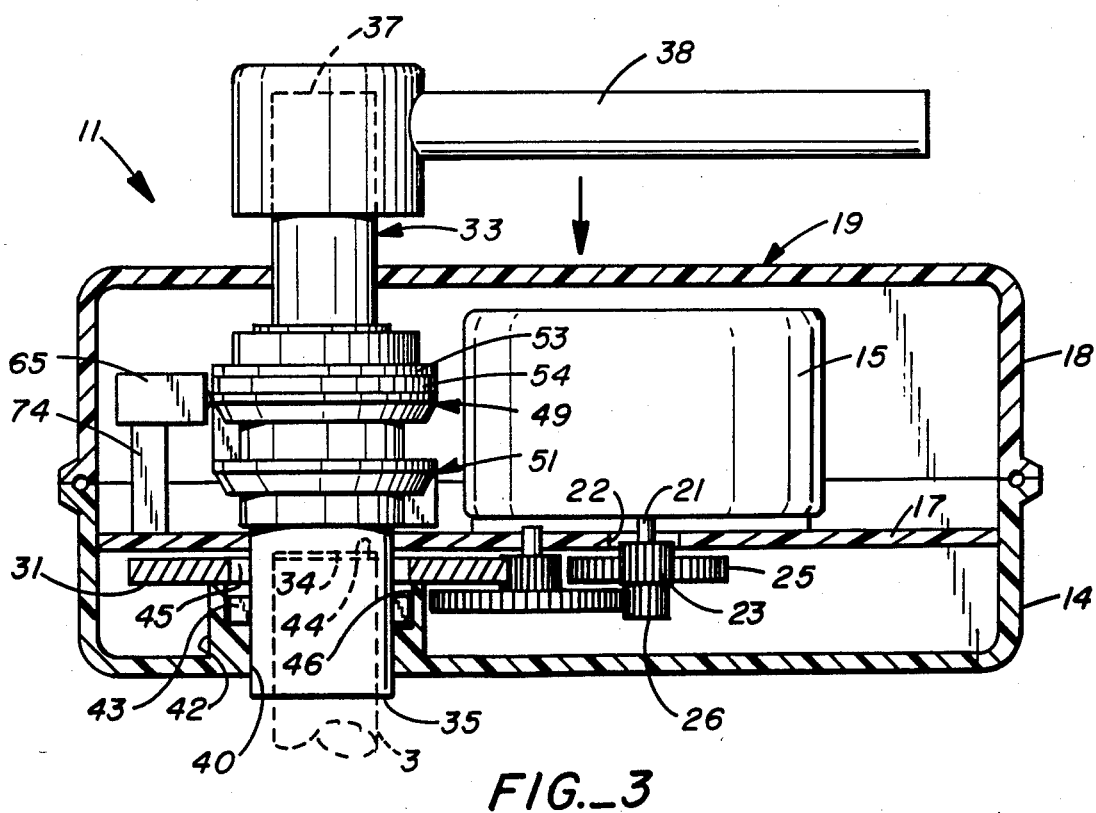
FIG._3

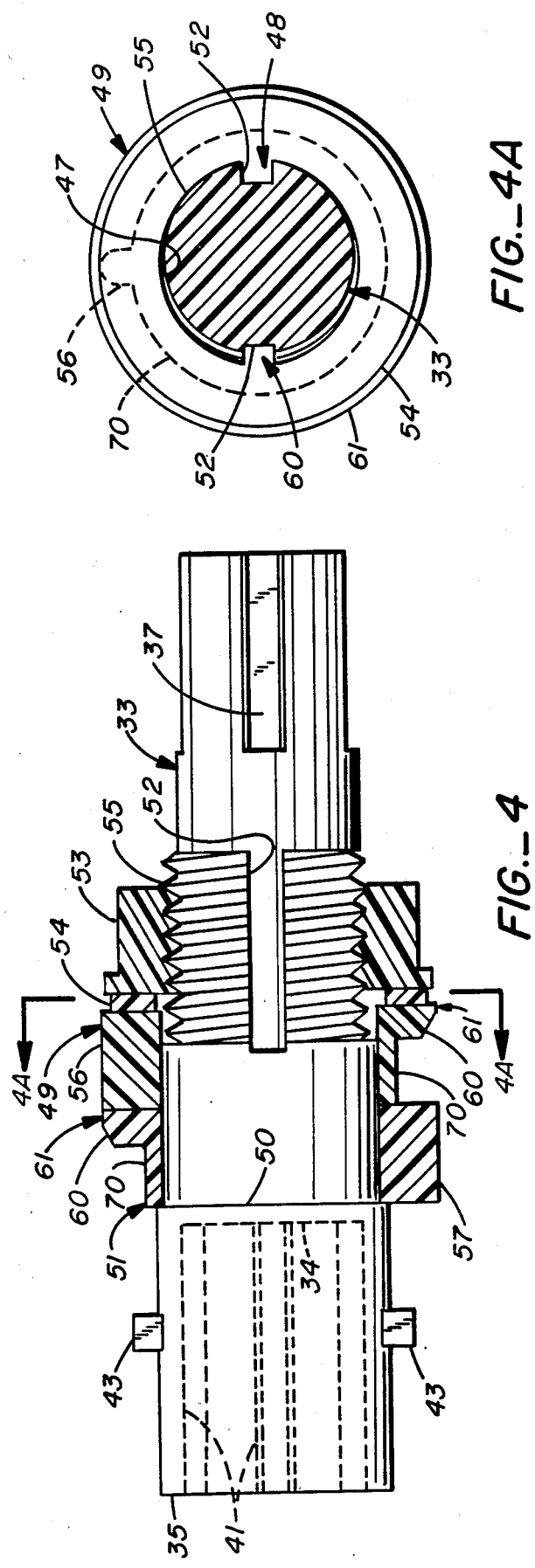
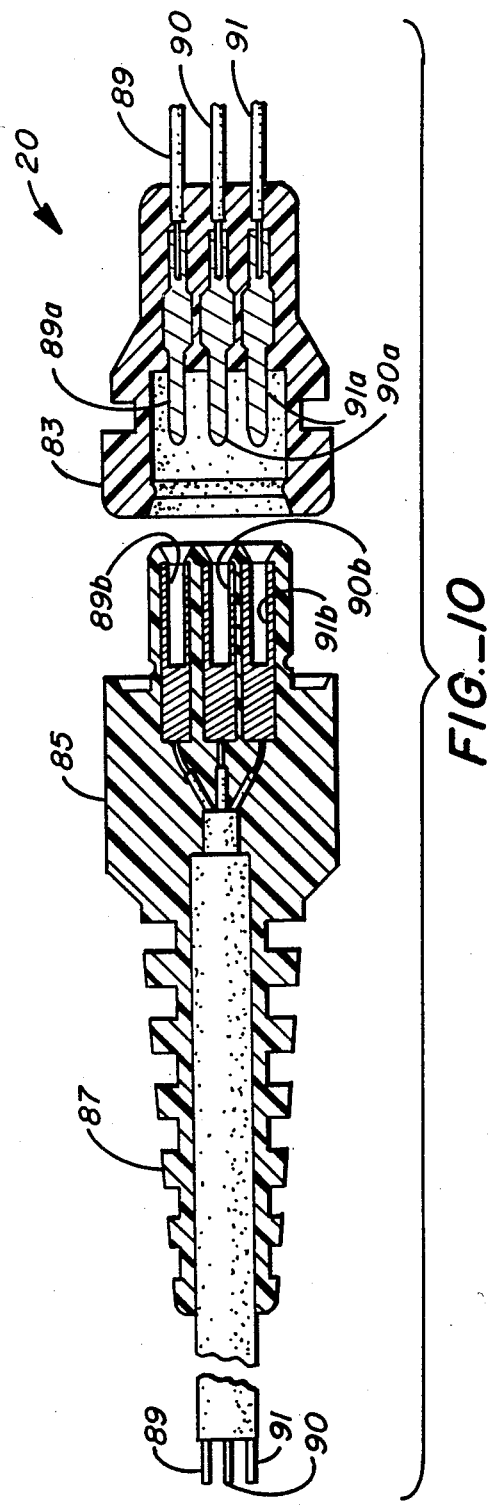
FIG._4A
FIG._4
FIG._10

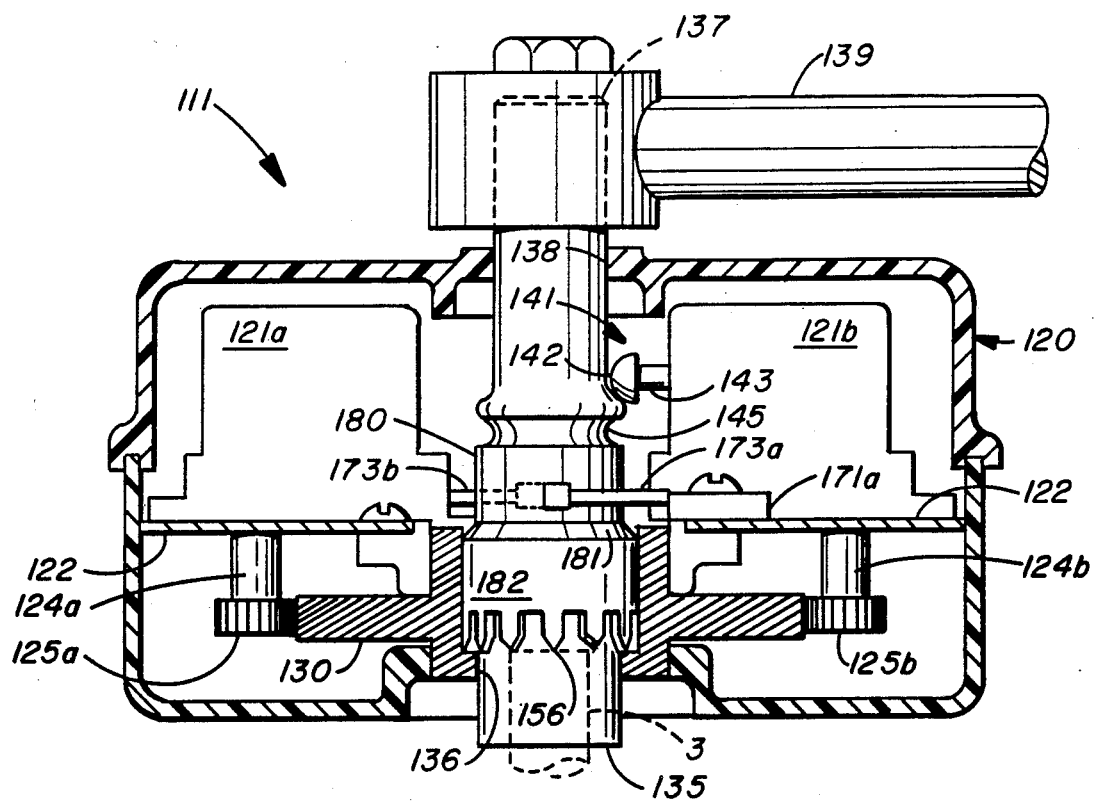
FIG._5
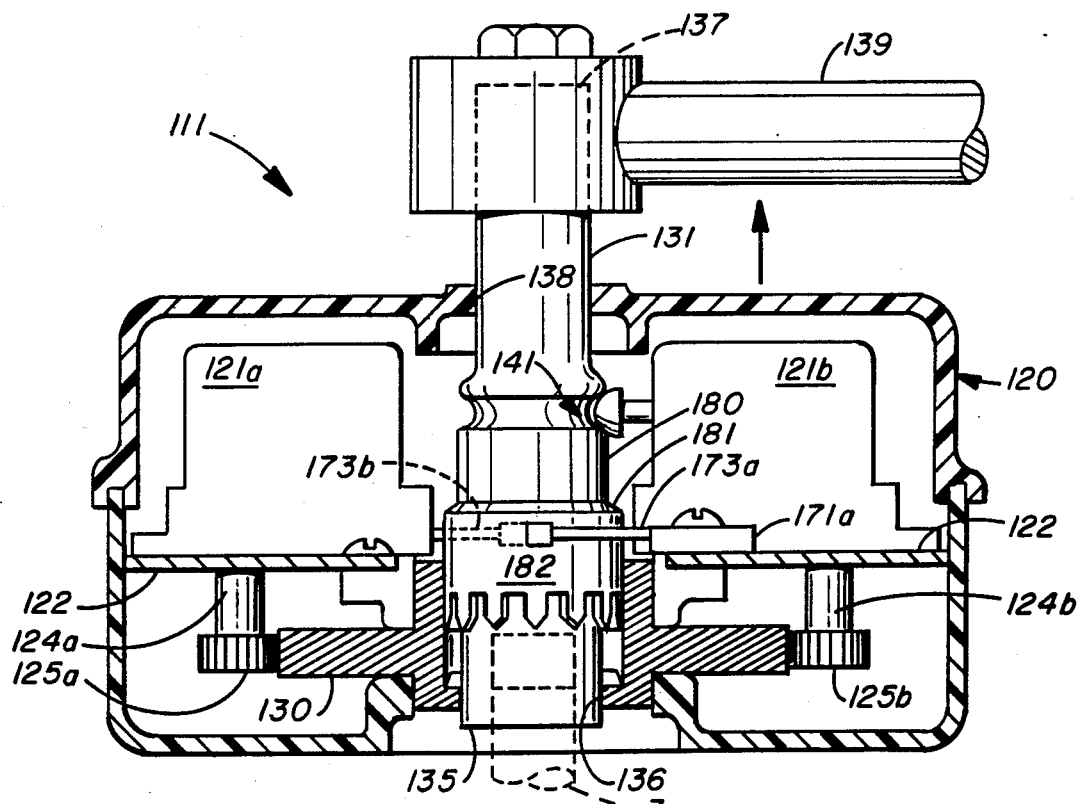
FIG._6

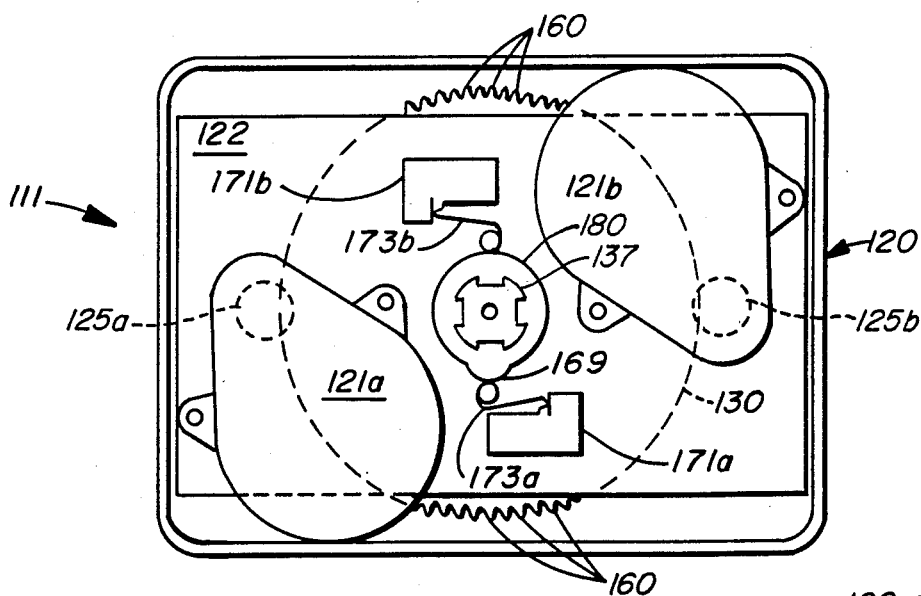
FIG._7
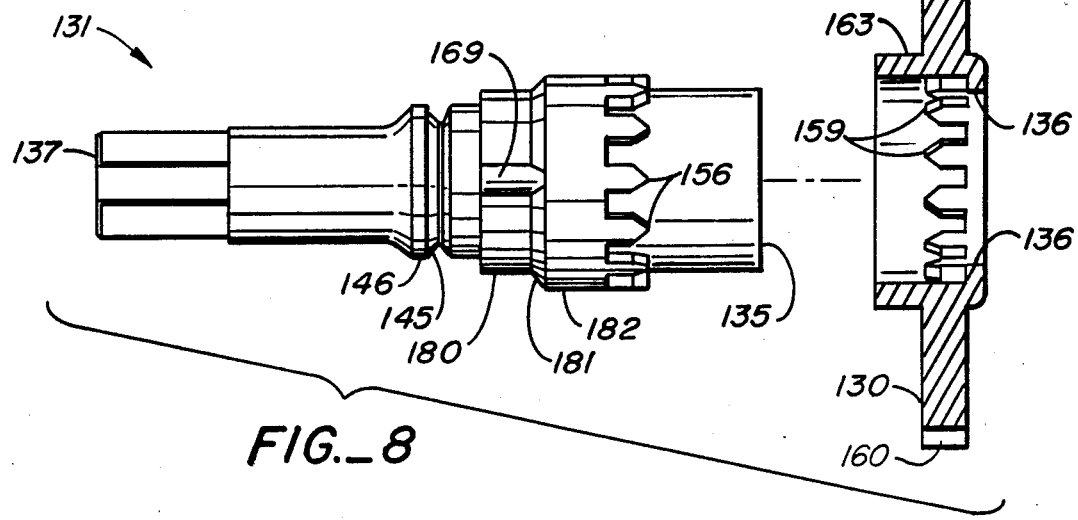
FIG._8
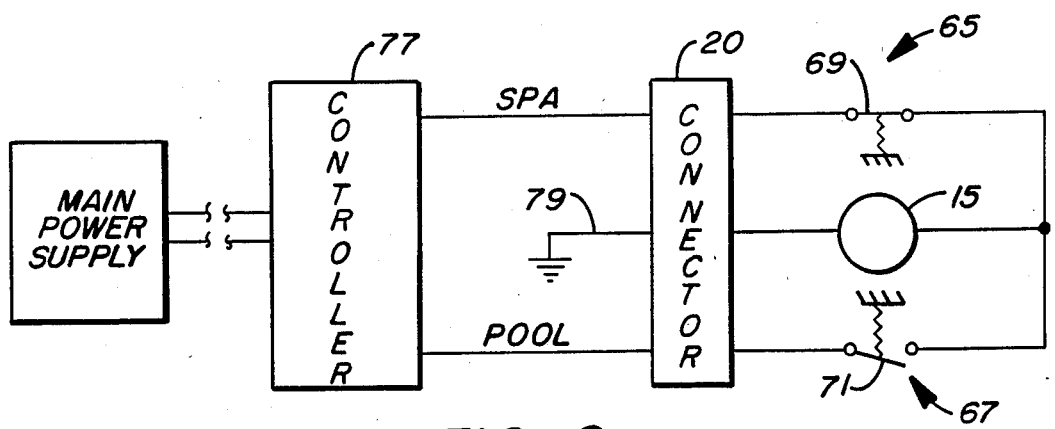
FIG._9

VALVE ACTUATOR WITH MANUAL DISENGAGEMENT ASSEMBLY

BACKGROUND OF THE INVENTION

1. Field of the Invention

The present invention relates to automatic valve actuators or operators with provision for manual override operation.

2. State of the Art

It is well known to provide automatic actuators to operate valves for displacement to two or more desired positions. Typically, such automatic valve actuators utilize an electric motor which is coupled to a rotatable valve stem through a gear set. Such devices are used, for example, in systems which control the pumping, heating and filtration of water for swimming pools and spas. In such systems using automatic valve actuators, it is sometimes desirable to manually alter, or override, the setting of the valve. In typical prior art systems, manual override of a valve is accomplished by disconnecting the power to the valve drive motor and then manually engaging a valve displacement member to turn a rotatable portion of the valve together with the gear set and the rotor of the drive motor. Such a system is described, for example, in U.S. Pat. No. 2,550,906 to Britton.

One shortcoming of prior art manual override systems, such as ones shown in the patent to Britton, is that the systems are physically difficult to operate for a person of average strength, especially where the gear sets have substantial gear-reduction ratios. Nevertheless, a need frequently arises to manually override automatic valve operators; for example, the valve operators may need to be manually overridden for reasons of maintenance or simply to operate a system in a manner differently from the programmed mode of automatic operation.

Additionally, it is highly advantageous to be able to adjust the angular position or positions at which a valve operator stops the valve during its programmed or automatic operation. A diverter valve in a pool/spa system may be rotated, for example, to a position blocking the flow of water to the spa completely, or it may be more desirable to rotate the valve to a position blocking only ⅔ of the flow of water to the spa to permit some flow or blow-by to the spa. Prior art valve operators have not afforded the flexibility of easy adjustment of the valve angular positioning of the valve by the valve operator to accommodate variations between the respective pool and spa volumes from system to system. Instead, such prior valve operators have tended to depend upon the system controller and timing changes to accommodate the flow requirements as between the pool and spa and as between one pool/spa system and another.

Finally, it is typical for the plumbing portion of a pool/spa system to be constructed by one contractor while the automatic controls are installed by another. Thus, the valve operator installer is often faced with piping and valving which is coupled to direct water to the pool and the spa, but with no indication as to which position of the valve will produce flow to either the pool or the spa. The valve installer must install the valve operator, turn the system on. If the valve operator drives the valve to the "spa" position and water flows in fact to the pool, the valve operator must be rewired to reverse the flow so that the "spa" position corresponds to the flow of water to the spa. This rewiring on the job is time consuming and often results in the introduction of moisture into the electrical system of the valve operator with resultant corrosion.

OBJECTS OF THE INVENTION

A primary object of the present invention is to provide an improved valve operator with manual override for selective powered and manual displacement of a valve.

Another object of the present invention is to provide an improved valve operator with manual override for selective powered and manual displacement of a valve wherein a transmission assembly is selectively decoupled from the valve during operation of the manual override.

Still another object of the present invention is to provide an improved valve operator with manual override wherein operation of a manual override mechanism automatically disables powered operation.

A further object of the present invention is to provide a valve operator in which the positions to which the valve is driven by the valve operator can be easily adjusted to accommodate system parameters.

Another object of the present invention is to provide a valve operator in which the direction of driving of the valve can be reversed to accommodate various plumbing configurations.

In accordance with the preceding, the present invention provides an improved valve operator with manual override for selective powered and manual displacement of a valve of the type having a rotatably displaceable valve stem wherein the valve operator includes a manually-operable coupling shaft mounted for selective manual movement, preferably axially, from a first position to a second position while maintaining operative connection of the shaft for rotation of the valve stem. Further, the valve operator includes a drive motor and a transmission assembly connected to transmit rotary motion from the drive motor to the coupling shaft when the coupling shaft is in the first position and connected to be disengaged from the coupling shaft when the coupling mechanism is in the second position.

Still further, the valve operator includes at least one displaceable limit switch formed to de-energize the drive motor upon displacement of the switch, and switch actuating means provided on the coupling shaft to displace the limit switch. When the coupling shaft is in the first position, the switch actuating means de-energizes the drive motor when the coupling shaft reaches an angular position corresponding to the desired angular orientation of the valve. The switch actuating means is further formed to maintain the limit switch in a displaced condition when the coupling shaft is moved to the second position to de-energize the drive motor for all angular positions of the coupling shaft.

In accordance with the preceding, an advantage of the present invention is the provision of an improved valve operator with manual override for selective powered and manual displacement of a valve such that, in the manual mode, valve displacement can be accomplished without concomitant displacement of a drive motor and gear transmission assembly. Accordingly, a particular advantage of the present invention is the provision of an improved valve operator with manual override and a method of manually overriding the valve operator which permits improved ease of manual operation.

Another advantage of the present invention is the provision of an improved valve operator with manual override wherein operation of the manual override mechanism automatically disables powered operation.

In accordance with the preceding, these and other objects and advantages of the present invention will no doubt become obvious to those of ordinary skill in the art after having read the following detailed description of the preferred embodiment which is illustrated in the various drawing figures.

BRIEF DESCRIPTION OF THE DRAWINGS

FIG. 1 is an exploded perspective view of one embodiment of a valve operator according to the present invention;

FIG. 2 is a side view of the valve operator of FIG. 1 in a first operational position, which view is partially cutaway in transverse cross-section to show various components of the valve operator;

FIG. 3 is a side view of the valve operator of FIG. 1 in a second operational position;

FIG. 4 is a cross-sectional detail of a shaft and other components of the valve operator of FIG. 1, drawn to an enlarged scale for purposes of clarity;

FIG. 4A is a transverse cross-section view taken substantially along the plane of line 4A—4A in FIG. 4.

FIG. 5 is a side view of an alternative embodiment of a valve operator according to the present invention in a first operational position, which view is partially cutaway in transverse cross-section to show various components of the valve operator;

FIG. 6 is a side view of the valve operator of FIG. 5 in a second operational position;

FIG. 7 is a plan sectional view of the valve operator of FIG. 5 taken along lines 7—7 of FIG. 5 for viewing in the direction of the arrows;

FIG. 8 is a side view of two of the components of the valve operator of FIG. 5, which components are shown in an exploded condition and partially in transverse cross-section for descriptive purposes;

FIG. 9 is a schematic diagram of an electrical circuit for operation of the valve operators of the preceding figures; and FIG. 10 is an enlarged, side view in cross-section of an electrical connector assembly for use with the valve operators of the preceding figures.

DESCRIPTION OF THE PREFERRED EMBODIMENT

FIGS. 1 through 3 generally show an automatic valve operator 11 which has the feature of providing improved manual override for selective powered and manual displacement of a displaceable valve stem 3 (shown in dashed lines in FIGS. 2 and 3) and an associated valve member (not shown). It should be appreciated that such valves are conventional and can be, for example, two-way or three-way valves of the type typically utilized to control the flow of water in the heating and filtration systems for swimming pools and spas. With such valves for pool-and-spa combinations, a first position of the valve can direct water to flow from the pumping system through the valve to the swimming pool, and the second position of the valve can direct water to flow from the pumping system to the spa. Examples of such valves are shown in U.S. Pat. Nos. 4,470,429; 4,169,491; and 3,938,553.

Speaking generally, valve operator 11 in FIGS. 1-3 includes a motor 15 mounted within a protective housing 19, a transmission assembly to transmit the rotational movement of the rotor of motor 15 while reducing rotational velocity and increasing torque, and coupling means movably engaging rotatable valve stem 3 and arranged for engagement with the transmission assembly to provide selective powered and manual rotational displacement of valve stem 3. More particularly, in the valve operator in FIGS. 1-3, motor 15 is stationarily mounted upon a support plate 17 fixed within protective housing 19. Electrical power for motor 15 is provided via a conductor assembly 20 whose structure and function will be described in detail hereinafter.

As best shown in FIG. 1, the housing 19 can be split so that an upper portion 18 of the housing can be readily removed from the lower portion 14 to permit access to the interior of the housing for maintenance of the valve operator. Housing 19 is secured, e.g., by fasteners (not shown), to the body of the valve for driving operation of the same. Motor 15 includes a driven rotor shaft 21 which extends through an aperture 22 in support plate 17; a gear member 23 is attached to the distal end of shaft 21 for rotation below the support plate 17.

Gear 23 is one component of the aforementioned transmission assembly. In the embodiment shown in FIGS. 1 through 3, other components of the transmission assembly include a second circular gear 25 mounted for rotation about a stationary shaft 27 and positioned to engage the gear 23, a third gear 26 mounted for rotation with gear 25 on shaft 27, a fourth gear 30 mounted to a shaft 28 to engage third gear 26 for driving thereby, a fifth gear 29 fixed coaxially to gear 30 for rotation therewith on shaft 28, and a large diameter circular gear 31 which is mounted to engage gear 29. Circular gear 31 has a central aperture 32 (FIG. 1) formed therein to accommodate a coupling shaft 33 in a manner which will be described hereinafter in detail. In assembled condition, support plate 17 is fixedly mounted in lower portion 14 of housing 19 such that the transmission gears 23, 25, 26, 29, 30 and 31 are free to rotate but cannot move substantially upwardly or downwardly along their axial centerlines. Such a condition of the transmission gears is best shown in FIGS. 2 and 3.

Coupling shaft 33 provides both the coupling means for rotating valve stem 3 automatically by power of motor 15 and the means for manually overriding the motor-driven system to rotate valve stem 3 independently of the transmission assembly and drive motor 15. In the embodiment shown in FIGS. 1 through 4, coupling shaft 33 has an end 35 which slidably engages valve stem 3, and an opposite end 37, which can be splined to a lever 38, such as a handle or handwheel for manual rotation of the valve stem 3. End 37 of coupling shaft 33 extends through an aperture 39 in upper section 18 of housing 19, and end 35 extends at least into (FIG. 2) or through (FIG. 3) an aperture 40 formed in lower section 14 of housing 19. Sliding engagement between end 35 and valve stem 3 is accomplished by forming end 35 as a hollow tubular portion whose interior side wall has splines 41 (FIG. 4) to engage the valve stem upon rotational movement of shaft 33 about its axial centerline while allowing shaft 33 to slide in the axial direction relative to valve stem 3 without causing rotation.

At this juncture, it can be appreciated that FIG. 2 shows coupling shaft 33 and wall 34 of hollow end 35 upwardly displaced axially relative to the end 44 of valve stem 3 and, by way of contrast, FIG. 3 shows coupling shaft 33 engaging a greater extent of valve stem 3 and end 44 moved into close proximity to wall 34. In both FIGS. 2 and 3, however, hollow end 35 and rotation driving splines 41 of coupling shaft 33 are in engagement with valve stem 3 such that rotation of the coupling shaft 33 about its longitudinal axis causes rotation of valve stem 3 and, hence, displacement (usually rotational displacement) of a valve member to which stem 3 is attached. The location of coupling shaft 33 shown in FIG. 2 is referred to as its "first position" and is the position for transmitting a valve-displacement force from motor 15 through the transmission assembly to valve stem 3. The location of coupling shaft 33 shown in FIG. 3 is referred to as its "second position" and is the position at which coupling shaft 33 can be manually rotated for rotational displacement of vavle stem 3 independently of the transmission assembly and drive motor 15. In other words, coupling shaft 33 is in driven engagement with the transmission gears in the first position (FIG. 2) and is free of engagement with the transmission gears in the second position, (FIG. 3).

One means for selectively engaging coupling shaft 33 to circular gear 31 is illustrated in FIG. 1. In this embodiment, end 35 of shaft 33 is circular in cross-section and has tang members 43 which protrude radially outward at a location spaced from the end of coupling shaft 33. Although the number of such tang members 43 is a matter of design choice, preferred practice is to utilize two tangs 43 which protrude diagonally opposite one another from shaft 33. Regardless of the number of tang members utilized, all should be spaced the same distance from end 35 of the coupling shaft 33. As also shown in FIG. 1, aperture 32 in main drive gear 31 is provided with radially outwardly extending recesses 45 dimensioned to accept tang members 43 when coupling shaft 33 is in the first position (FIG. 2). The number of such recesses 45 is a matter of design choice but, in practice, at least four equally spaced apart recesses 45 are provided. Lower housing portion 14 preferably further includes annular sleeve 42 with annular recess 46 therein to receive tangs 43 when shaft 33 is shifted axially down to disengage the tangs from gear 31. In such a structural interrelationship with main gear 31, coupling shaft 33 can be readily moved axially upward or downward relative to main gear 31 to effect engagement to or disengagement from main gear 31.

Upon consideration of FIG. 2, it will be noted that tang members 43 are seated within two recesses 45 in main gear 31 and, thus, driving engagement is provided between coupling shaft 33 and gear 31; by way of contrast, in FIG. 3, tang members 43 are displaced below the upper surface of main gear 31 and, therefore, coupling shaft 33 is free to rotate independently of main gear 31. The transmission assembly between the motor and coupling shaft produces a substantial increase in the torque generated to drive valve stem 3, which is required because most diverter valves inherently have substantial friction during their operation. This torque increase, however, inhibits manual operation of the valve by requiring the user to rotate the gear assembly and motor, as well as the valve. Uncoupling shaft 33 from gear 31, therefore, greatly reduces the forces resisting manual operation of the valve.

In order to prevent continued operation of the valve operator motor when the apparatus of the present invention is in manual mode, it is a further important feature of the present invention to switch off power to the motor when coupling shaft 33 is disengaged from gear 31. Additionally, of course, motor 15 must be switched off when the valve is rotated to its predetermined angular position as programmed by the user.

FIGS. 1–4 also show switching means to switch off electrical power to motor 15 either when shaft 33 has rotated a predetermined angular distance or when coupling shaft 33 is displaced axially downward far enough that tang members 43 no longer engage circular gear 31 (i.e., when coupling shaft 33 is displaced to the second position, as shown in FIG. 3). In this embodiment, annular collar members 49 and 51, substantially identical to one another, are mounted about shaft 33 and secured thereon by a nut 53 and washer 54 engaging a threaded portion 55 of shaft 33.

The valve operator of the present invention is preferably employed with a programmable controller or timer. Thus, the controller will periodically turn valve operator 11 "on" to advance the valve to a new position. Typically, the valve will be switched between pool and spa in accordance with needs for filtration, heating or the like. In the automatic operating mode as controlled by the timer, therefore, the timer will power the valve operator until the valve is displaced, rotated, to the desired position for pool or spa, at which point valve operator 11 will shut down the motor even though the timer may still be supplying power to the valve operator. Collars 49 and 51 and switches 65 and 67 provide the means for programmed operation and shut-down of motor 15.

Since each pool and spa system will have different operating parameters, it is desirable to be able to adjust the angular orientation of the diverter valve relatively precisely. For one system the valve may completely block the pool line when the spa is being heated, while for another the pool line will only be partially blocked to permit blow-by to the pool. Accordingly, the nut-washer-thread assembly for securing collars 49 and 51 affords a structure for easy setting and adjustment of the angle at which motor 15 is de-energized and rotation of the diverter valve stopped.

Referring to FIGS. 1, 4 and 4A, coupling shaft 33 may be seen to include a shoulder 50 against which collar 51 is abutted. Spaced from shoulder 50 is a threaded portion 55 in which at least one, and in this case two, axially extending slots 52 are formed. Collars 49 and 51 and washer 54 are slidably mounted over threads 55 with inwardly protruding tabs 48 on washer 54 received in slots 52 so that washer 54 is restrained against rotation by slots 52. Washer 54 is preferably constructed so that tabs 52 hold the washer centered on shaft 33 with the internal diameter 47 of the washer outwardly spaced from threads 55. Thus, the rotational motion of nut 53 as it is tightened down on threads 55 is not transmitted to the collars. The result is that collars 49 and 51 are frictionally clamped between washer 54 and shoulder 50 in exactly the angular orientation desired, and tightening of nut 53 does not disturb that setting.

Control of the angle at which collars 49 and 51 are mounted to shaft 33 is important because each collar carries an axially extending, outwardly protruding rib or lobe which switches power off to the motor to stop valve rotation. As best may be seen in FIG. 1, collar 49 includes rib or lobe 56 and collar 51 includes rib or lobe 57. Also, each of the annular collar members 49 and 51 have circular rim portions which are comprised of gradually outwardly and upwardly tapering frusto-conical surfaces 60 and cylindrical surfaces 61; the radial extent of cylindrical rim portions 61 is substantially the same as the radial extent of ribs 56 and 57.

Switches 65 and 67 preferably are provided as normally closed switches, i.e., switches having switch actuating arms 69 and 71, respectively, which are biased toward a position outwardly or away from the switches, at which position the switches are closed or will pass an electrical current. When arms 69 and 71 are displaced toward the switch bodies, for example by lobes or ribs 56 or 57, the switches are opened. Switches 65 and 67, therefore, are mounted to support plate 17 by mounting means 73 and 74 which position switch 65 for periodic engagement by rib 56 and position switch 67 for periodic engagement by rib 57, when coupling shaft 33 is in the first or automatic operation position of FIG. 2. As will be seen in FIG. 2, arm 69 is just in front and extends radially inwardly of rib 56, and collar 49 is formed with a skirt portion 70 which permits switch arm 69 to be biased away from the switch body a sufficient distance to close the switch. The limit switches are connected in a control circuit associated with motor 15 such that current to motor 15 can be interrupted when either of the arms 69 or 71 is substantially displaced from its normally closed position to an open position in which the arm engages and is displaced by a rib. Switches 65 and 67 are conventional items available from various commercial sources, and as will be appreciated, switches 65 and 67 also could be biased outwardly, held in a closed position by an annular collar and opened by a recess in the collar.

An example of a control circuit for operating in conjunction with the switches 65 and 67 is shown in FIG. 9. In this embodiment, it should be understood that timer or controller mechanism 77 is conventional and does not comprise a part of the present invention. In the control circuit, a conductor labelled SPA carries electrical power from timer 77 to switch 65 via connector assembly 20. With arm 69 of switch 65 in the closed position (biased outwardly of the switch body toward collar skirt 70), electrical current can pass through switch 65 to energize motor 15. Likewise, a conductor labelled POOL carries electrical power from timer 77 to switch 67 via connector assembly 20. With arm 71 of switch 67 in the closed position, electrical current can pass through switch 67 to energize motor 15. Conductor 79 provides a return path for current from motor 15. It should be appreciated that timer 77 provides a conventional switching function for power from a main power supply and, therefore, only provides power on the SPA line during certain predetermined periods and, likewise, only provides power on the POOL line during other predetermined times exclusive of the times when the SPA line carries current.

Operation of the embodiment of the valve operator in FIGS. 1-4 can be readily understood in conjunction with the circuit of FIG. 9. With the operator assembled and in the first position or automatically-powered operating position (FIG. 2), coupling shaft 31 is located such that tang members 43 engage recesses 45 in main drive gear 31. Accordingly, when motor 15 is energized to cause rotation of rotor shaft 21, main gear 31 will be driven to rotate via the transmission assembly comprised of gears 23, 25, 26, 29 and 30. The time of initiation of any such rotation is determined by timer 77 of FIG. 9, and the extent of any such rotation is determined by operation of limit switches 65 and 67. If it is initially assumed that both limit switches 65 and 67 are closed and that timer 77 is operating to provide power (e.g. 24 volt alternating current) on the SPA line but not on the POOL line, then current will flow through switch 65 to energize motor 15. Such energization of motor 15 will cause rotation of rotor shaft 21 (FIG. 1) and, via the transmission assembly, rotation of main gear 31 and coupling shaft 33. In turn, rotation of coupling shaft 33 will cause rotational displacement of valve stem 3. During such times as the motor 15 is energized by the flow of current through switch 65, coupling shaft 33 will rotate the valve stem 3 toward a position to permit water flow to the spa of the system through the associated valve while blocking or reducing flow to the pool.

With switch 65 open and switch 67 closed, operation of motor 15 cannot resume until timer 77 provides power on the POOL line. At such time as power is provided on the POOL line, current flows through switch 67 to energize motor 15 to, consequently, cause rotation of coupling shaft 33. In turn, rotation of coupling shaft 33 will cause rotational displacement of the valve stem 3 and the associated valve member toward the position at which water is permitted to flow to the pool of the system while flow to the spa is blocked. Under such circumstances, rotation of coupling shaft 33 will continue until vertical rib 57 on collar member 51 encounters arm 71 on switch 67 and moves that arm to a switch-open position. After switch 67 has been opened by abutment with rib 57, current to motor 15 is interrupted and rotation of coupling shaft 33 is halted. It should be noted that, during the period of rotation of coupling shaft 33, rib 56 of upper collar member 49 travels to a position of disengagement with arm 69 of limit switch 65 and, accordingly, switch 65 is again placed in the closed position and can transmit power from timer 77 via the SPA line at any time dictated by timer 77. (Such action is possible, of course, only if ribs 56 and 57 are not axially aligned with each other.)

To manually override operation of the aforedescribed system, coupling shaft 33 is pressed downward toward the position shown in FIG. 3 such that tang members 43 disengage main gear 31. In the FIG. 3 position, coupling shaft 33 still engages valve stem 3 and, furthermore, transition from the FIG. 2 position to the FIG. 3 position causes no rotational displacement of valve stem 3. With coupling shaft 33 in the FIG. 3 position, coupling shaft 33 can be readily rotated manually by lever 38 without causing rotational displacement of the transmission assembly gears 31, 30, 29, 26, 25, 23 or motor 15. Further, displacement of coupling shaft 33 to the FIG. 3 position serves to disenable switches 65 and 67 such that motor 15 cannot be energized even if timer 77 (FIG. 9) provides current on the POOL or SPA lines. In the illustrated embodiment, such disenablement occurs because, as coupling shaft 33 is pressed downward, switch arms 69 and 71 ride, respectively, onto outwardly tapering surfaces 60 to cylindrical rims 61. Thus, both switch 65 and 67 are concurrently forced open by downward motion or shifting of coupling shaft 33. Such disenablement of current to motor 15 precludes the motor from running without load and, further, precludes the inconvenient and potentially dangerous situation of motor 15 running while coupling shaft 33 is being manually operated.

In the alternative embodiment in FIGS. 5-8, valve operator 111 includes two motors 121a and 121b stationarily mounted upon a support plate 122 fixed within housing 120. Motors 121a and 121b include rotatably driven shafts 124a and 124b, respectively, whose distal ends are keyed to circular gears 125a and 125b so that the circular gears 125a and 125b rotate with the motor shafts. Circular gears 125a and 125b are constructed and arranged to rotatably drive a centrally arranged ring gear 130 through teeth 160. Ring gear 130 and circular gears 125a and 125b can be collectively referred to as a transmission assembly to denote the function of transmitting torque and rotational movement from the motors 121a and 121b to a coupling shaft 131.

In the embodiment in FIGS. 5 through 8, coupling shaft 131 is operatively connected to valve stem 3 for, in a first position (FIG. 5), powered rotation of the valve stem or for, in a second position (FIG. 6), selective manual rotation of the valve stem. Coupling shaft 131 has an end 135 which extends through a central aperture 136 in ring gear 130 to slidably engage valve stem 3 and an opposite end 137 which extends through an aperture 138 in housing 120 for connection to a lever 139 for manual rotation and positioning of shaft 131. It should be appreciated that FIG. 6 shows coupling shaft 131 displaced somewhat upward from the valve stem 3 and, by way of contrast, FIG. 5 shows end 135 of coupling shaft 131 engaging a greater extent of valve stem 3. In both FIGS. 1 and 2, however, end 135 of coupling shaft 131 is in rotational engagement with valve stem 3 such that rotation of shaft 131 about its longitudinal axis causes rotation of the valve stem 3 and, hence, rotational displacement of an associated valve member.

In FIGS. 5–8, as in the previously described embodiment, rotational displacement of valve stem 3 is accomplished by forming end 135 of coupling shaft 131 as a hollow tubular portion whose interior sidewall is splined or contoured to engage valve stem 3 upon rotational movement while allowing coupling shaft 131 to slide axially without rotation of valve stem 3.

To assist in maintaining coupling shaft 131 either in the first position or in the second position, a detent 141 can be provided. In the illustrated embodiment, detent 141 includes a spring-biased cap piece 142 mounted to a stem member 143 which, in turn, is stationarily mounted to the side of motor 121b such that cap piece 142 can move under pressure towards the side of the shaft 131. Further, the sidewall of coupling shaft 131 is contoured, as by provision of an annular recess 145 and an adjoining generally annular lip 146, to receive spring-biased cap piece 142. Thus, detent 141 engages annular recess 145 to hold the shaft 33 in the second position shown in FIG. 6 or, alternatively, engages lip 146 outside the recess 145 to hold the shaft 131 in the first position shown in FIG. 5. In neither the first nor second position, does detent 141 interfere with rotation of coupling shaft 131.

Coupling shaft 131 is further constructed and arranged such that ring gear 130 is in rotational engagement with coupling shaft 131 in the first position of shaft 131 (FIG. 5) and is disengaged from shaft 131 in the second position (FIG. 6). Thus, as shown in FIGS. 5 and 8–10, a circular array of gear teeth 156 is formed about coupling shaft 131 and a mating circular array of teeth 159 is formed about central aperture 136 integrally with ring gear 130. The circular array of teeth 159 on ring gear 130 is arranged to drivingly engage teeth 156 on shaft 131 when shaft 131 is in the second position. In practice, ring gear 130 has a collar 163 which extends axially of the circular array of teeth 159 on ring gear 130 to provide structural stability to the assembly of ring gear 130 and coupling shaft 131.

FIGS. 5 through 7 also show an alternative embodiment of means to control motorized rotation of coupling shaft 131. More particularly, a vertically extending lobe or rib 169 is formed on the side of coupling shaft 131, and limit switches 171a and 171b are mounted on stationary plate 122 so that arm members 173a and 173b associated with the switches can be displaced by rib 169 upon rotation of coupling shaft 131. The limit switches 171a and 171b are on-off switches essentially identical to previously-described switches 65 and 67, and can be understood to be in the off condition when associated arms 176a and 176b are displaced by rib 161. The limit switches can be electrically coupled to an electrical circuit similar to the one described in conjunction with FIG. 9 to control energization of the motors 121a and 121b.

Operation of the embodiment of FIGS. 5 through 8 in the powered or automatic mode can be readily understood. In the normal condition of operation, coupling shaft 131 is in the first position (FIG. 5). In such a position, gear teeth 156 on the shaft 131 engage teeth 159 on ring gear 130 and, when motors 121a and 121b are energized, rotation of either of gears 125a and 125b causes rotation of ring gear 130 which, in turn, causes rotation of the coupling shaft 131. The extent of powered rotation of shaft 131 is controlled by limit switches 171a and 171b. Thus, with rib 169 in the position shown in FIG. 7, arm 173a of limit switch 171a is displaced to the off position. In the control system of this embodiment switch 171a can be assumed equivalent to switch 71 in the circuit of FIG. 9 and, likewise, switch 171b can be considered equivalent to switch 67 of the embodiment shown in FIGS. 1 through 4. Accordingly, switch 171b would be associated with the POOL line and switch 171a would be associated with the SPA line. In the position shown in FIG. 7, switch 171b would be open and would de-energize motors 121a and 121b so long as current was available only through the POOL line. When current becomes available at the SPA line due to action of timer 77, motors 121a and 121b are activated and cause rotation of the transmission assembly until such time as rib 169 displaces arm 173a to place switch 171a in the off condition. After switch 171b has been opened, current on the SPA line to motors 121a and 121b is interrupted and rotation of coupling shaft 131 is stopped. Motors 121a and 121b will remain de-energized until such time as timer 77 provides current on the POOL line through switch 171b.

Thus, it may be understood that a difference in the operation of the control system between the embodiment in FIGS. 1 through 4 and the embodiment in FIGS. 5 through 8 is that, in the latter embodiment, the "off" positions of switches 171a and 171b in terms of angular rotation of coupling shaft 131 cannot be adjusted after the switches are fixed to support plate 122; by way of contrast, in the embodiment in FIGS. 1 through 4, adjustable collar members 49 and 51 allow the off positions of switches 65 and 67 to be determined and adjusted independently. It would be possible, of course, to provide adjustable mounts for switches 171a and 171b as an alternative to adjustable collars 49 and 51.

To place the coupling shaft 133 in the manual override position (FIG. 6), shaft 131 is pulled axially away from valve stem 3 with sufficient effort to overcome the biasing force of detent 141. Upward movement of shaft 131 is continued until detent 141 moves into annular recess 145. Such movement of shaft 131 from the first position (FIG. 5) to second position (FIG. 6), disengages gear teeth 156 and 159, but does not cause rotation of valve stem 3. Because valve stem 3 and coupling shaft 131 remain in engagement with one another in the second position (FIG. 6), manual rotation of coupling shaft 131 will force valve stem 3 to rotate without causing movement of ring gear 130 or circular gears 125a and 125b.

The embodiment of FIGS. 5 through 8 also provides a means to place switches 171a and 171b in the off condition when coupling shaft 131 is in the manual override position regardless of the angular position of shaft 131 when the shaft is shifted for manual override. More particularly, coupling shaft 131 includes a skirt portion 180, an outwardly tapered surface 181 and a cylindrical rim portion 182 located such that, when coupling shaft 131 is raised to the manual override position (FIG. 6), arms 173a and 173b ride from skirt 180 along taper 181 onto rim portion 182 and, thus, switches 171a and 171b are forced to open.

The manual override system in the described embodiments provides substantial advantages over the prior art. One advantage is that users of the system need not work against the torque of a gear transmission assembly or of drive motors when manually overriding the automatic drive. Another advantage is that manual override can be accomplished without having to independently de-energize electrical power to the automatic drive motors or without having to re-set a master control system.

As shown in FIG. 10, the electrical connector assembly 20 for either of valve operators 11 and 111 preferably includes a first plug 83 for mounting on the housing of the valve operator, and a second plug 85 for selective engagement or disengagement with plug 83. Preferably, second plug 85 includes a flexible neck section 87. Both plugs 83 and 85 carry three conductive wires 89, 90 and 91 in side-by-side planar relationship. In the illustrated embodiment, wires 89, 90 and 91 terminate in the plug 83 in prongs 89a, 90a and 91a, respectively. Likewise, wires 89, 90 and 91 terminate in plug 85 in receptacles or female connectors 89b, 90b and 91b to receive respective prongs 89a, 90a and 91a. As so located and arranged, prongs 89a, 90a and 91a carried by plug 83 can be readily connected with receptacles 89b, 90b and 91b in plug 85 or, by rotating plug 85 by one-hundred eighty degrees about its longitudinal axis, prong 89a can be connected with receptacle 91b, prong 90a can be connected with receptacle 90b, and prong 91a can be connected with receptacle 89b. Thus, plug 83 can be connected with male connector 85 in two, and only two, ways.

In operation of the connector assembly 20 of FIG. 10, prongs 89a, 90a and 91a correspond, respectively, with the SPA line, the ground line 79 and the POOL line of FIG. 9. In practice, plug 83 has a flat face 95 (FIG. 1) formed parallel to the plane of the three receptacles 89b, 90b and 91b which can be selectively labelled by the user once he determines the proper orientation of male connector 85 to connect the SPA line from timer 77 with the SPA line of the valve operator and, therefore, the proper orientation to connect the POOL line from timer 77 with the POOL line of the valve operator. It may be appreciated by those skilled in the art that connector assembly 20 provides a convenient means of wiring the valve operator to a timer without undue experimentation or complicated rewiring which would require opening of the valve operator and exposing the wiring to moisture. Thus, if the plumbing of the system makes it unclear as to which plumbing lines run to the pool and which to the spa, the valve can be operated by the valve operator in one position of plug 85, and if the lines are backwards, plug 85 reversed to correct the problem.

Although the present invention has been described with particular reference to the illustrated embodiments, it is to be understood that such disclosure is not to be interpreted as limiting. Various other alterations, modifications and embodiments will no doubt become apparent to those skilled in the art after having read the preceding disclosure. Accordingly, it is intended that the appended claims be interpreted as covering all such alterations, modifications and embodiments as fall within the true spirit and scope of the present invention.

What is claimed is:

1. A valve operator with manual override for selective powered and manual displacement of a valve of the type having a rotatably displaceable valve stem comprising:

a manually-operable coupling shaft mounted for selective manual movement between a first position and a second position, the coupling shaft being operatively connected to rotatably displace said valve stem in both said first and second positions;

drive motor means;

transmission means operatively connected to said drive motor means and arranged for engagement with the coupling shaft in said first position to transmit rotational displacement force from said drive motor means to said valve stem, and arranged for disengagement from said coupling shaft when said coupling shaft is in said second position, thereby permitting manual rotational displacement of said valve stem by manual rotation of the coupling shaft independent of the transmission means and the drive motor means;

displaceable limit switch means connected to deenergize the drive motor means upon displacement of the limit switch means; and limit switch actuation means carried by the coupling shaft in a position for displacement of the limit switch means to effect de-energization of the drive motor means, the limit switch actuation means being formed to displace the limit switch means in at least one angular location of the coupling shaft when the coupling shaft is in the first position to de-energize the drive motor means, and the limit switch actuation means being further formed to maintain the limit switch means in displaced condition to de-energize the drive motor means when the coupling shaft is moved to the second position.

2. A valve operator as defined in claim 1 wherein, said transmission means includes a gear assembly coupled to increase the torque transmitted to said valve stem from said drive motor means.

3. A valve operator as defined in claim 1 further including, detent means formed to retain the manually-operable coupling shaft in the selected one of said first position and said second position.

4. A valve operator as defined in claim 1 wherein, the coupling shaft is mounted for manual movement between said first position and said second position in a direction along the axis of rotation of the coupling shaft, and the coupling shaft has an end formed for slidable coupling and rotational locking to said valve stem.

5. A valve operator as defined in claim 4 wherein, the coupling shaft has a gear member mounted thereabout for engagement with, and disengagement from, the transmission means.

6. A valve operator as defined in claim 4 wherein, said end of the coupling shaft is hollow and is internally contoured for receiving the valve stem in rotational locking engagement relative to said valve stem without rotational movement.

7. A valve operator as defined in claim 6 wherein, the internal wall of the hollow end of the coupling shaft has linear splines formed thereon which extend parallel to the axial centerline of the shaft.

8. A valve operator as defined in claim 5 wherein, the gear member has a central aperture formed therein to rotatably receive the coupling shaft, and the coupling shaft is provided with means to engage said gear in the first position only.

9. A valve operator as defined in claim 8 wherein, said means to engage said gear comprise tang members fixed to the coupling shaft to rotatably extend therefrom and said gear has outwardly extending recesses formed in said central aperture to receive said tang members when angularly aligned therewith.

10. A valve operator as defined in claim 8 wherein, said means to engage said gear comprises a first circular array of gear teeth fixed about the periphery of the coupling shaft, and a mating circular array of gear teeth fixed to said gear member and surrounding said central aperture for engagement with said first circular array of gear teeth in the first position and for disengagement from said first circular array of gear teeth in the second position.

11. A valve operator as defined in claim 3 wherein, said detent means includes a circular groove and an adjacent circular lip formed on the sidewall of the coupling shaft to define, respectively, said first position and said second position.

12. A valve operator as defined in claim 6 wherein, the switch actuating means comprises an outwardly protruding rim portion surrounding the sidewall of the coupling shaft and located to displace the limit switch means upon displacement of the coupling shaft from said first position to said second position.

13. A valve operator as defined in claim 12 wherein, the rim portion is outwardly tapered and formed integrally with the coupling shaft.

14. A valve operator as defined in claim 12 wherein, said limit switch actuating means is provided by a first collar member mounted for angular displacement on the coupling shaft, said rim portion is provided on said first collar member as an outwardly-tapered rim and said limit switch actuating means further includes a rib formed on said first collar member and extending normal to said outwardly-tapered rim portion.

15. A valve operator as defined in claim 14 wherein, the first collar member mounted to the coupling shaft for adjustment of the angular position of said rib for adjustment of the angular position at which displacement of the limit switch occurs when the coupling shaft is in the first position.

16. A valve operator as defined in claim 16 wherein, said limit switch means includes first and second displaceable limit switches;

a second collar member having an integral outwardly-tapered rim portion and protruding rib extending from said rim portion in a direction along the axis of the coupling shaft;

said second collar member being mounted about the coupling shaft for adjustment of the angular position of the rib with respect to the coupling shaft;

collar securement means mounted to the coupling shaft and formed for securement of the first and second collar members in a fixed angular orientation on the coupling shaft; and the first limit switch being positioned for displacement by the rib and rim portion on the first collar member and the second limit switch being positioned for displacement by the rib and rim portion on the second collar member.

17. A valve operator as defined in claim 16 wherein, said collar securement means is provided by a threaded nut and a washer mounted to thread means provided on the coupling shaft to apply a clamping force axially of the coupling shaft to clamp the collar members in a fixed angular orientation.

18. A valve operator as defined in claim 17 wherein, said washer and thread means are cooperatively formed to prevent rotation of said washer with respect to the coupling shaft during rotation of said nut.

19. A valve operator as defined in claim 1 wherein, said limit switch means and said limit switch actuation means are cooperatively formed to de-energize said drive motor means in two angularly spaced apart orientations; and an electrical conductor assembly including an electrical first conductor means connected at one end to said drive motor means, a first plug member connexcted to said first conductor means at an opposite end thereof, a second plug member formed for mating coupling of to said first plug member in either of two different orientations, and an electrical second conductor means coupled to said second plug member at one end and formed at an opposite end for electrical connection to a source of electrical power, said first and second conductor means, said plug members and said limit switch means being formed and connected to drive said drive motor means until de-energized at one angular position upon coupling of said plug members in one of said two orientations and to drive said drive motor means until de-energized at a second angular position upon coupling of said plug members in a remainder of said two orientations.

20. A valve operator as defined in claim 19 wherein, said limit switch means includes displaceable first and second limit switches; and said first and second conductor means electrically connect the drive motor means to the source of electrical power with said first, and second limit switches being in series with the drive motor means via said first and second conductor means.

21. A valve operator as defined in claim 20 wherein, said first and second conductor means includes three conductor lines, and said first and second plug members each include three terminals arranged coplanar with one another and equidistantly spaced apart.

22. A valve operator as defined in claim 21 wherein, said second plug member includes means to indicate a preferred orientation of said second plug member relative to said first plug member.

* * * * *